Oct. 29, 1963   R. S. HANSON   3,108,455
REFRIGERATOR WITH MEAT STORAGE RECEPTACLE
Filed May 14, 1962   2 Sheets-Sheet 1
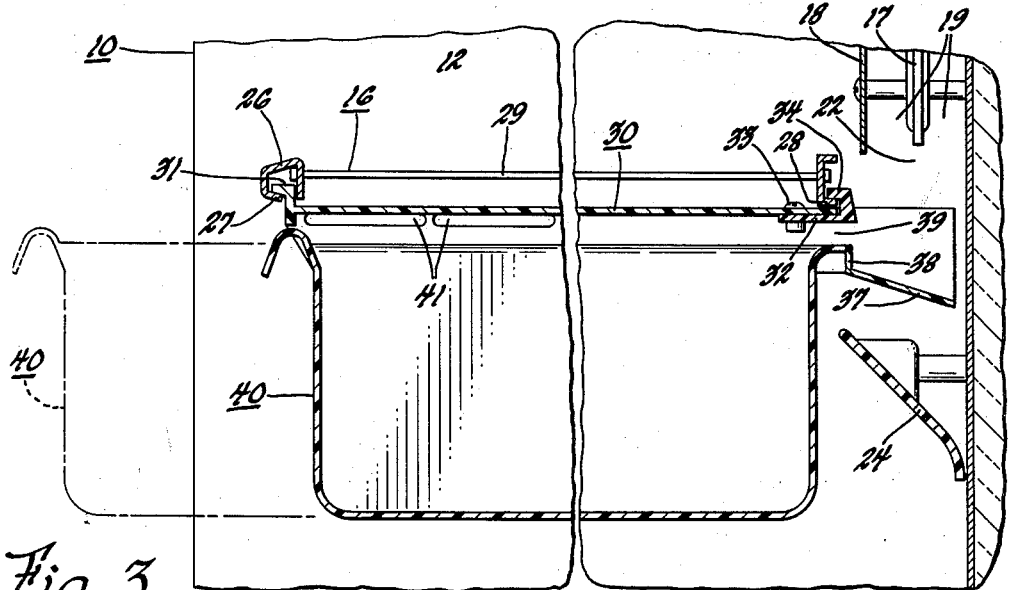
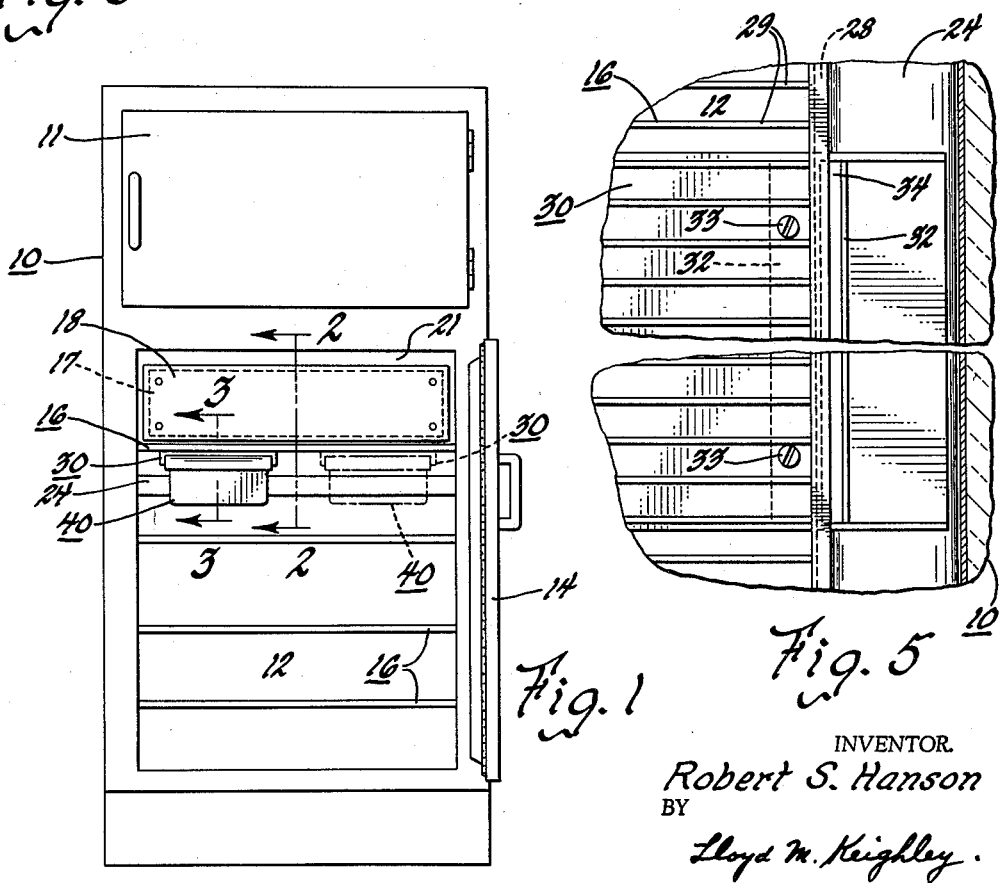
INVENTOR.
Robert S. Hanson
BY
Lloyd M. Keighley.
HIS ATTORNEY Oct. 29, 1963 R. S. HANSON 3,108,455
REFRIGERATOR WITH MEAT STORAGE RECEPTACLE
Filed May 14, 1962 2 Sheets-Sheet 2

INVENTOR.
Robert S. Hanson
BY
Lloyd M. Keighley
HIS ATTORNEY

United States Patent Office 3,108,455
Patented Oct. 29, 1963

3,108,455
REFRIGERATOR WITH MEAT STORAGE
RECEPTACLE
Robert S. Hanson, Kettering, Ohio, assignor to General
Motors Corporation, Detroit, Mich., a corporation of
Delaware
Filed May 14, 1962, Ser. No. 194,408
2 Claims. (Cl. 62—382)

This invention relates to refrigerating apparatus and particularly to the refrigeration of food products within a receptacle located in a food storage chamber of a household refrigerator.

Receptacles, such as so-called meat tender containers, for several years past have been incorporated in an above-freezing food storage chamber of refrigerators. These receptacles are utilized for the storage of fresh meat cuts, such as steaks and chops, for maintenance at a low but unfrozen temperature in a food storage chamber of a refrigerator cabinet. While the storage of fresh meat cuts in a household refrigerator cabinet is somewhat temporary, since they are usually cooked within a week or ten days, it is nevertheless important that these meat cuts be properly preserved during this time in order to retain the freshness thereof. In the past, a glidable covered receptacle for such purpose has been mounted in a food chamber of a refrigerator cabinet at a predetermined point therein selected, for various reasons, by manufacturers of refrigerators. A meat tender receptacle or container in a food chamber has not heretofore been entirely satisfactory to users of refrigerators because the one or all-time location thereof in the chamber prevents a housewife from changing the storage of food products in the vicinity of the receptacle and therefore she is, much to her chagrin and dislike, deprived of a diversified arrangement or rearrangement of foods stored within such chambers. This has instigated the lodging with manufacturers of household refrigerators numerous complaints which I contemplate to eliminate in a fashion that is advantageous to makers of such refrigerators.

An object of my invention is to arrange a receptacle on a shelf in a refrigerated chamber of a refrigerator cabinet which receptacle is glidable outwardly of the chamber while supported therein when its access door is opened for sliding movement relative to the shelf in order that its position within the chamber can be adjusted with respect to upright walls thereof.

Another object of my invention is to support a covered fresh meat storage receptacle from a shelf in a refrigerated chamber of a household refrigerator cabinet in such a manner that the receptacle is movable along the width of the shelf within and transversely across the chamber to facilitate and provide for a diversification in storage of food products therein.

In carrying out the foregoing objects it is a further object of my invention to arrange a covered receptacle unit on a shelf within a food storage chamber of a refrigerator cabinet in direct exposed relationship with a chilled air outlet of a flue in the chamber for gliding movement outwardly of the cover of the receptacle to afford access to the interior thereof for sliding movement along the shelf transversely of the chamber and to provide for efficient circulation of air from the outlet of the flue into and out of the covered receptacle in all transverse adjusted positions of the receptacle unit in the chamber whereby to effect proper cooling of fresh cuts of meat or similar food products placed therein for storage.

Further objects and advantages of the present invention will be apparent from the following description, reference being had to the accompanying drawings wherein a preferred embodiment of the present invention is clearly shown.

In the drawings:

FIGURE 1 is a front view of a household refrigerator cabinet with the access door to a food storage chamber thereof in open position showing my invention incorporated therein;

FIGURE 3 is a broken fragmentary vertical sectional view in one direction through the covered receptacle unit taken on the line 3—3 of FIGURE 1;

FIGURE 5 is a broken fragmentary top view taken on the line 5—5 of FIGURE 2 of the rear portion of the adjustable unit.

Figure 2:
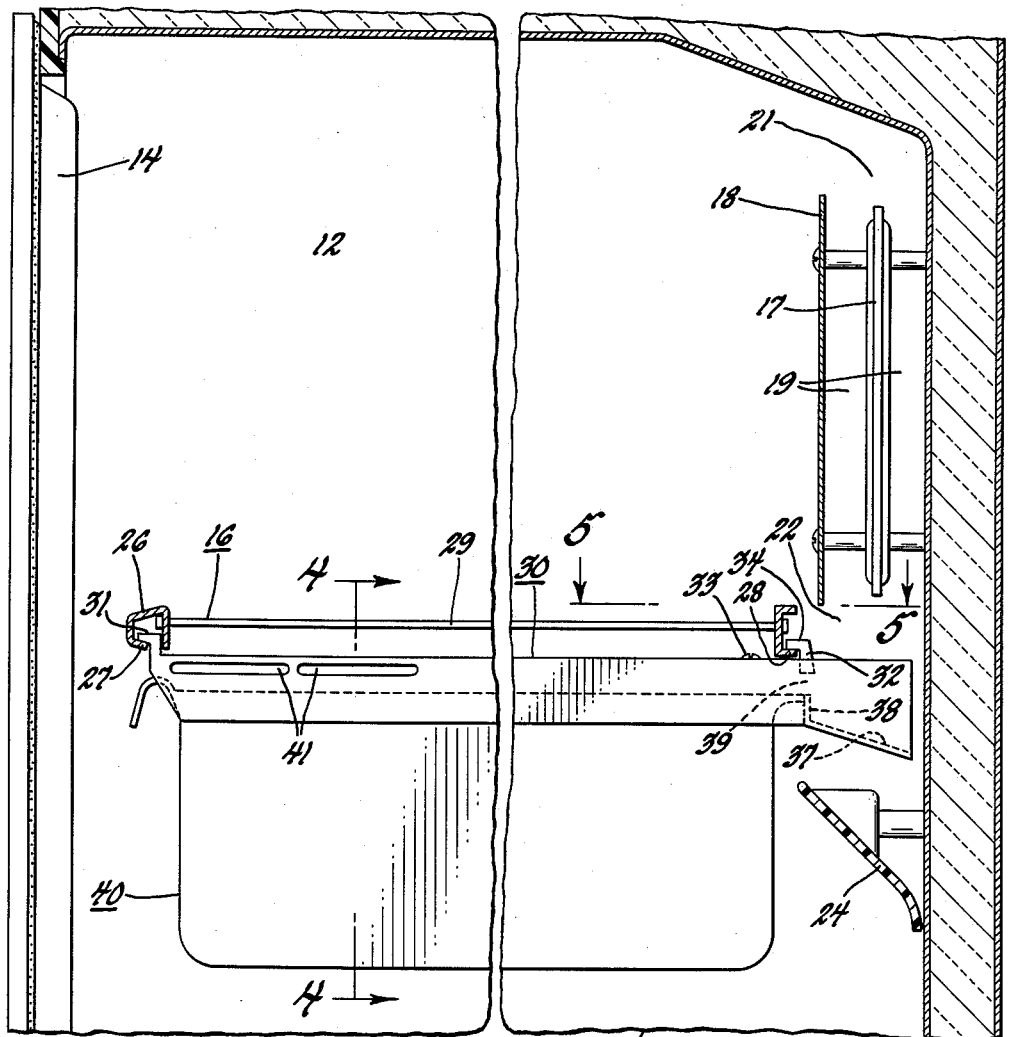
FIGURE 2 is an enlarged broken fragmentary sectional view taken on the line 2—2 of FIGURE 1 showing an adjustable covered receptacle unit carried by a shelf in the refrigerated food storage chamber of the cabinet associated with a chilled air outlet of a flue in the chamber.

Referring to the drawings, for illustrating the invention, I show in FIGURE 1 thereof a refrigerator cabinet generally represented by the reference numeral 10 having a refrigerating system (not shown) associated therewith. For purposes of the present disclosure a refrigerating system incorporated in cabinet 10 may be of the type fully shown and described in the patent to C. H. Wurtz et al. No. 2,672,020 dated March 16, 1954 and assigned to the assignee of this application. By reference to this patent the construction of the cabinet and refrigerating system together with operation of the system is to be considered a part of my disclosure needing no detailed description herein. The household refrigerator cabinet 10 is of a character which includes a plurality of double walls having insulation disposed therebetween and defining a freezing or frozen food storage compartment in the upper portion thereof, closed by door 11, and an unfrozen food storage chamber 12 below the freezing compartment having a front access opening normally closed by the opened door 14. Chamber 12 has vertically spaced-apart wire or the like food supporting shelves 16 disposed therein and secured to walls thereof by pegs or hooks as is conventional in the art. The shelves 16 each occupy substantially an entire horizontal cross-sectional area of chamber 12. The refrigerating system associated with cabinet 10 includes a vertical plate-like sheet metal refrigerant evaporator 17 secured to and spaced from the rear wall of chamber 12. A cover plate or baffle 18 is disposed in front of and spaced from evaporator 17. Baffle 18 is preferably secured to rear wall of chamber 12 by the same means employed to mount the evaporator 17 thereon as is conventional and this baffle forms with the chamber rear wall a flue 19 provided with an upper air inlet 21 and a lower air outlet 22 in which the evaporator is disposed (see FIGURE 2). The cooling effect produced by evaporator 17 creates a convective circulation of air within chamber 12 into the inlet 21 of flue 19 over the evaporator which chills the air and causes the chilled air to egress or be discharged out of the flue through its outlet 22. Since the evaporator 17 is periodically defrosted, in accordance with the patented disclosure hereinbefore identified, a water drain trough 24 is mounted on the rear wall of chamber 12 to catch the defrost water and direct it downwardly along this chamber wall to a drain trap outlet. It is to be noted that flue 19 and trough 24 extend substantially entirely across the rear wall of chamber 12 intermediate upright sides thereof.

Figure 4:
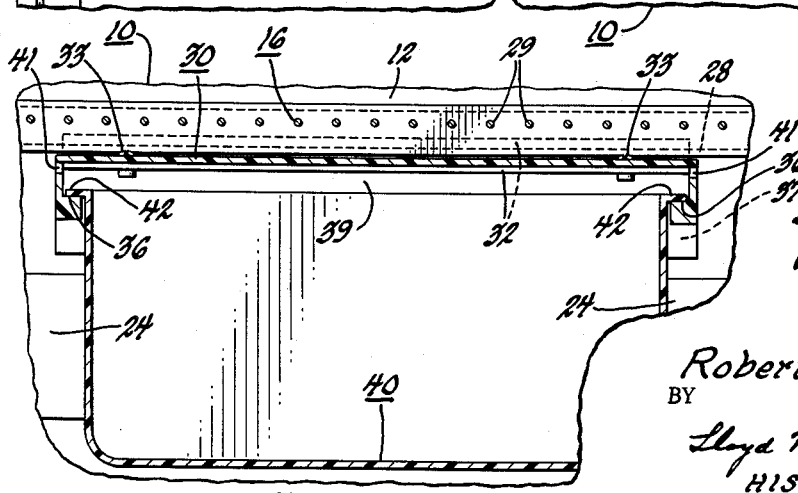
FIGURE 4 is a fragmentary vertical sectional view taken on the line 4—4 of FIGURE 2 in either direction through the covered receptacle unit.

The uppermost shelf 16 comprises a sheet metal front bar 26 which is rolled or bent over to provide a trap portion 27 thereon, a channel-shaped rear bar providing a track portion 28 thereon and spaced-apart food supporting cross wires or rods 29 welded or riveted to the front and rear bars of the shelf (see FIGURES 2, 3 and 4). A cover or plate-like member 30, preferably molded of any suitable or desirable plastic material, is supported by the uppermost shelf 16 for sliding movement relative thereto transversely of chamber 12 or along the width of the shelf. Plate member 30 is provided at the front thereof with a tongue 31 disposed within the hollow portion of front bar 26 of shelf 16 and slidably rests on track 27 thereof. A separate molded plastic piece 32 secured to the undersurface of the rear portion of cover or plate-like member 30, by screws or bolts 33, has a tongue 34 thereon which extends over and slidably rests on track 28 of the rear bar of shelf 16. Cover or plate member 30 has depending sides each provided along the inner surface thereof with tracks 36 (see FIGURE 4) for a purpose to be presently described. The member 30 is also provided along the rear thereof with an integral downwardly sloping or inclined lip-like extended surface 37 having an integral upwardly directed short wall 38 thereon which is spaced from the bottom of piece 32 to form an aperture 39 therebetween. Aperture 39 together with wall 38 spaced therefrom form an air inlet passage and the wall 38 forms a stop both to be hereinafter described. Each depending side of member 30 has elongated apertures 41 therein near the front thereof forming air discharge passages. The uppermost shelf 16 is mounted within chamber 12 in the vicinity of the outlet 22 of flue 19 so as to position the lip surface 37 and the air inlet passage 39 of member 30 in exposed relationship to or adjacent the path of air egressing from the outlet 22 of flue 19. A preferably molded plastic container or pan member 40 having flanges or lips 42 flared outwardly from top edges of sides thereof is carried by or suspended from the opposed tracks 36 on plate member 30 (see FIGURE 4). The container or pan member 40 forms with plate-like member 30 components or cooperating movable parts of a covered receptacle unit in the present disclosure. Pan member 40 is glidable relative to plate-like member 30 while supported therefrom outwardly of chamber 12, as indicated by the dot-dash lines in FIGURE 3 of the drawings, when its access opening door 14 is opened to afford access to the contents of the pan. A raised top front wall of pan member 40 is substantially closed against a depending lip at the front of plate member 30 while the top back wall of member 40 normally abuts against the stop or short vertical wall portion 38 or member 30. The back wall of pan member 40 is directly opposed to the path of chilled air egressing from flue 19 and apertures 39 and 41 provide means for causing flow of air into and out of the covered receptacle unit. Since pan member 40 is suspendingly supported from plate member 30, which is slidingly carried by tracks 27 and 28 on the front and rear bars of shelf 16, and since the entire covered receptacle unit is of less width than the width of the shelf, the unit is, in accordance with my invention, bodily slidable along the shelf transversely within chamber 12 as indicated by the dot-dash lines in FIGURE 1 of the drawings.

Having described the construction and arrangement of the adjustable covered meat container or receptacle unit herein disclosed its utility or function will now be explained. When cuts of fresh meat are placed in pan member 40, glided outwardly of plate-like member 30, of the receptacle unit and this pan member is slid back, along tracks 36, under the plate-like member with its back wall against the stop wall 38, chilled air egressing or being discharged through the flue outlet 22 flows into and around the meat through rear aperture or inlet passage 39 of the unit and then flows outwardly thereof through the forward apertures or side outlet passages 41. Inclined lip 37 at the back of the container or receptacle unit serves as a scoop in the path of air egressing from outlet 22 of flue 19 to direct this air into passage 39 and also serves to convey drip water, during defrosting periods of evaporator 17, away from the container or receptacle unit toward the rear wall of chamber 12 or into drain trough 24. Chilled air entering the covered receptacle unit is at a temperature below air ambient thereto or below that generally within the confine of chamber 12 and consequently the interior of pan member 40 and meats therein are cooled to a relatively lower temperature than the temperature of air surrounding the unit. In this manner the cuts of meat in the covered unit, component members 30 and 40, are maintained at a sufficiently low temperature to preserve the freshness thereof for several weeks. At any time it is desired to change the location of the covered receptacle unit within chamber 12, between the two uppermost shelves 16, this unit is bodily slid along the tracks 27 and 28 on the upper shelf 16 transversely within the chamber toward or away from a side wall thereof. This permits a different food storage within chamber 12 and particularly intermediate the two upper shelves 16 to thus provide a rearrangement of food products therein which could not be attained in former stationary or nontransversely adjusted meat tender receptacle units in refrigerator cabinets. In my present arrangement an effective flow of chilled air into and out of the covered receptacle unit is insured irrespective of transverse adjusted positions thereof between side walls of chamber 12.

From the foregoing it should be apparent that I have provided an improved adjustable covered receptacle unit in which meat may be kept in an unimpaired condition and stored for a prolonged period of time while maintaining the quality of freshness, etc. of the meat cuts, steaks or chops. The transverse adjustable feature of the receptacle unit within a refrigerated chamber of a refrigerator cabinet herein disclosed is attained at low cost and affords a user of a refrigerator some versatility in the storage of food products adjacent or in the vicinity of the unit. My invention is also of importance to manufacturers of refrigerators. The adjustability of a meat tender receptacle unit avoids complaints, relative to a fixed or nonchangeable location of such a unit within a refrigerated chamber of a refrigerator cabinet, as prescribed by refrigerator manufacturers and reduces their inventory. For example, parts, production instructions and published literature, as occasioned by manufacturers making both right and left-hand opening door type refrigerators, with respect to a predetermined point of mounting a meat tender receptacle unit in a refrigerated chamber of these different door opening type cabinets are eliminated since such point is not, in the provision of the transversely adjustable unit, critical. Thus my covered meat tender or receptacle unit is made adjustable at very little or no additional cost to a manufacturer and satisfies the desire of many housewives.

While the embodiment of the present invention as herein disclosed constitutes a preferred form, it is to be understood that other forms might be adopted.

What is claimed is as follows:

1. In combination with a refrigerator cabinet having a food storage chamber furnished with a front access opening normally closed by a door, a refrigerating system associated with said cabinet including a refrigerant evaporator disposed in a flue at the rear of said chamber provided with an outlet extending thereacross and wherein the cooling effect produced by said evaporator creates circulation of air from the chamber into said flue and outwardly of its outlet back into said chamber for chilling the interior thereof comprising;

(a) a shelf mounted within the chamber adjacent said flue outlet and extending entirely across a horizontal area of said chamber intermediate upright sides thereof, (b) said self being reticulated for circulation of air therethrough and having its rear edge spaced from the chamber back wall and disposed substantially in vertical alignment with the front wall of said flue, (c) a plate member beneath and supported by said shelf for sliding movement therealong, (d) said plate member having a lip-like extension thereon projecting rearwardly thereof beyond the rear edge of said shelf below said flue outlet and providing an air scoop on the plate member, (e) a pan member suspended from said plate member and forming therewith components of a covered receptacle depending from said reticulated shelf providing a single unit within a horizontal plane therebelow between sides of the chamber, (f) means for causing flow of air from said flue into and out of said covered receptacle whereby to cool food products placed therein to a temperature below the temperature ambient thereto in said chamber, (g) said means including in addition to said air scoop a vertically disposed horizontally elongated air inlet passage provided in the back of said plate member exposed to air egressing from the flue and an air discharge passage provided in a forward portion of the plate member above walls of said pan member, (h) the pan member of said covered receptacle being while supported from said plate member glidable outwardly of said chamber through its access opening when said door is opened, (i) said plate and pan member components of the covered receptacle both being of less width than said shelf and whereby the single unit is slidable therealong toward and away from an upright side of the chamber to adjust the position of said unit transversely within said chamber, and (j) said air scooping lip-like extension on said plate member remaining below said flue outlet in the path of air egressing therefrom at all positions of transverse adjustment of said single covered receptacle unit in the chamber.

2. The combination defined by claim 1 wherein the means for causing flow out of the covered receptacle unit includes an air discharge passage in the forward portion of each side of the plate member above walls of the pan member.

References Cited in the file of this patent

UNITED STATES PATENTS

| | | |
|---|---|---|
| 2,709,900 | Zearfoss | June 7, 1955 |
| 2,739,456 | Saunders | Mar. 27, 1956 |
| 3,063,772 | Kennedy | Nov. 13, 1962 |